United States Patent
Lagier

[11] Patent Number: 5,971,781
[45] Date of Patent: Oct. 26, 1999

[54] ROTARY CONTACTOR WITH A SHORT STRIP, IN PARTICULAR FOR MOTOR VEHICLES

[75] Inventor: Daniel Lagier, Nanterre, France

[73] Assignee: Valeo Electronique, Creteil, France

[21] Appl. No.: 08/836,155

[22] PCT Filed: Sep. 8, 1996

[86] PCT No.: PCT/FR96/01376

§ 371 Date: May 2, 1997

§ 102(e) Date: May 2, 1997

[87] PCT Pub. No.: WO97/09202

PCT Pub. Date: Mar. 13, 1997

[30] Foreign Application Priority Data

Sep. 7, 1995 [FR] France ................................. 95.10691

[51] Int. Cl.[6] ........................................... H01R 3/00
[52] U.S. Cl. .............................................. 439/164; 439/15
[58] Field of Search ....................................... 439/15, 164

[56] References Cited

U.S. PATENT DOCUMENTS

| | | | |
|---|---|---|---|
| 4,867,688 | 9/1989 | Suzuki | 439/15 |
| 5,010,784 | 4/1991 | Nakazato et al. | 74/498 |
| 5,171,153 | 12/1992 | Kubota et al. | 439/15 |
| 5,259,775 | 11/1993 | Kubota et al. | 439/164 |

FOREIGN PATENT DOCUMENTS

| | | |
|---|---|---|
| 478 455 | 4/1992 | European Pat. Off. . |
| 39 08 179 | 10/1989 | Germany . |
| 2 282 014 | 3/1995 | United Kingdom . |
| 95/02263 | 1/1995 | WIPO . |

*Primary Examiner*—Paula Bradley
*Assistant Examiner*—Katrina Davis
*Attorney, Agent, or Firm*—Morgan & Finnegan LLP

[57] ABSTRACT

The invention concerns a rotary contactor comprising a fixed casing which houses a movable hub and a flexible strip attached at one end to the hub and at its other end to the casing. An internal rotor is disposed radially between the hub and the internal bore of the casing. A planetary gear train supported by the casing, the internal rotor and the hub is provided for rotating the internal rotor via the hub. The internal rotor comprises means for the passage of the flexible strip. The invention is useful for motor vehicles.

13 Claims, 10 Drawing Sheets

ROTARY CONTACTOR WITH A SHORT STRIP, IN PARTICULAR FOR MOTOR VEHICLES

FIELD OF THE INVENTION

BACKGROUND OF THE INVENTION

The present invention relates to rotary contactors, especially for motor vehicles, of the kind comprising two coaxial parts which are mounted for rotation of one with respect to the other against the action of an electrically connecting flexible tape which is wound in a spiral between the said parts, being attached at one of its ends to one of the said parts and at its other end to the other one of the said parts.

Such a contactor is described for example in the document EP-A-0 479 567.

BRIEF SUMMARY OF THE INVENTION

Thus, in FIG. 11, there is shown at 100 an exploded view of a rotary contactor comprising a fixed part 101, 102 in the form of a housing fixed to the steering column of the motor vehicle, via the switch support which is located under the steering wheel and which is fixed to the end of the steering column.

This contactor includes a movable part 103 in the form of a hub, which is mounted for rotation on the base plate 102 of the housing 101, 102. The hub includes a chimney 106 which is adapted to be driven in rotation by the steering wheel of the vehicle, and which also constitutes a connector.

In practice, the hub 103 is mounted within the hollow housing which comprises the components 101, 102.

One end of the flexible tape 104 is attached to the said chimney 106, while the other end of the flexible tape 104 is attached to the base plate 102 of the fixed part.

In the known way, the flexible tape 104 comprises one or more electrical conductors 105, together with an insulator for insulating the conductors 105 from each other.

This tape 104 provides electrical connection between the two parts 101, 102–103 without any micro-fractures.

The rotary contactor 100 ensures electrical connections for the purpose of, for example, controlling an inflatable airbag for protecting
the driver, or for controlling the horn from the steering wheel. All of this depends on the application.

With this type of contactor, a problem arises because it is necessary to be able to execute for example 2.5 turns of the steering wheel in one direction and 2.5 turns of the steering wheel in the other direction.

Thus, the tape is spiral wound on the hub and is unwound on the housing in the same way as a watch spring. It has to be of substantial length, in order to satisfy the need for rotation of the order of five (5) turns which is necessary in most motor vehicles, this rotation being limited by abutments or by the tension in the tape.

The length of the tape is thus variable according to the diameters for internal winding and external unwinding which are determined by the size of the contactor.

In general terms, the length of these tapes is of the order of 3 to 6 meters, and represents a major part of the cost of the rotary contactor, especially in terms of the number of electrical paths or conductors 105 that are provided by the said tape 104. More than half of the price can be due to the tape in some cases.

It is also desirable to reduce the radial overall size of such a contactor fitted below the steering wheel in a position close to numerous electrical devices such as switches.

In practice, the internal diameter of the hub 103 is a function of the diameter of the steering shaft which passes through the fixed steering column of the vehicle.

Thus the internal diameter of the rotary contactor has a value which is imposed by external considerations.

In order to demultiply the number of turns between the hub and the housing, and to reduce the length of the tape, it has previously been proposed, in the documents U.S. Pat. No. 5,171,573 and EP-A-O 478 455, to provide the rotary contactor with an epicyclic gear train, with at least one pinion which is arranged to mesh with a set of internal teeth of the housing and with a set of external teeth of the hub.

In practice these pinions are of extended length, so as to carry rollers or bearings for guiding the flexible tape. For example, in the document EP-A-O 478 455, the flexible tape forms a U-shaped loop which is engaged on the bearings.

The tape is thus in discontinuous contact with the rollers or bearings, so that it is subjected to stresses which are detrimental to the useful life of the contactor.

In addition, the nature of this arrangement is such as to increase the height of the contactor, and this complicates the manufacture of the pinion.

An object of the present invention is to provide, in a simple and inexpensive way, a rotary contactor having reduced radial size and height, with a short tape which winds under good conditions, while also simplifying the pinion of the epicyclic gear train.

According to the invention, a contactor of the type described above is characterised in that the pinion is carried in rotation by an inner rotor of hollow annular form having an axially oriented annular skirt, in that the inner rotor is mounted in rotation on the movable hub, being mounted within the fixed housing, in that there is a space between the movable hub and the internal bore of the skirt of the inner rotor, for accommodating the tape and for winding of the latter around the movable hub, and in that the skirt of the inner rotor has passage means for the flexible tape, the latter being adapted to wind on to the skirt.

Thanks to the invention, the total size of the rotary contactor can be reduced in a simple and inexpensive way by taking as a basis the internal diameter of the hub, which is defined by the manufacturer's cost requirements, and the number of turns which the steering wheel has to make, while providing electrical continuity without any microfractures, by virtue of the short electrical connecting tape winding under good conditions on the hub and the inner rotor.

In this connection, thanks to the invention, and more particularly to the epicyclic gear train, it is possible as a consequence to reduce the length of the tape which is employed, because of the demultiplication effect on the number of turns between the fixed part (i.e. the housing) and the movable part (i.e. the hub), thus reducing the selling price of the contactor and minimising the cost of the components and assembly times, the housing and the hub being of simple forms.

Also reduced are the noises due to the length of the tape, while fitting of the contactor is made easier. The tape winds in a circular path on to the hub and the inner rotor. It is therefore well supported, and is preserved, thus prolonging the useful life of the contactor. The pinion is simplified.

In accordance with another feature of the invention, the rotary contactor further includes, within the fixed housing, an outer rotor with a disconnectable rotary drive system between the two rotors, such that the epicyclic gear train is of a double differential type.

This arrangement enables the length of the flexible tape to be reduced even more.

BRIEF SUMMARY OF THE DRAWINGS

Further features and advantages of the invention will appear in the light of the following description, given with reference to the attached drawings, in which:

FIG. 10 is a perspective view of the tape;

DETAILED DESCRIPTION OF THE INVENTION

Figure 1:
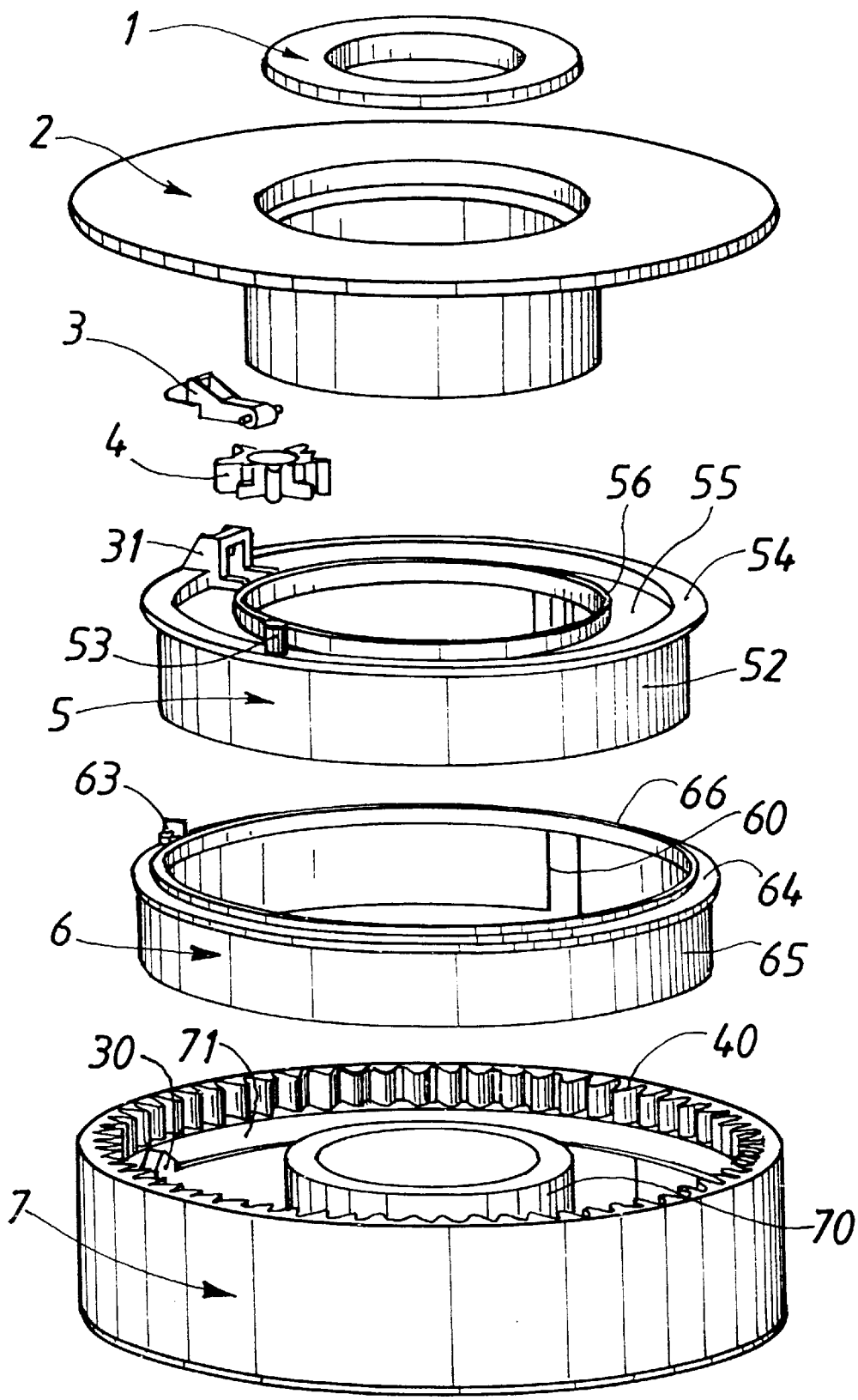
FIG. 1 is an exploded view of the rotary contactor without its flexible tape.
Figure 2:
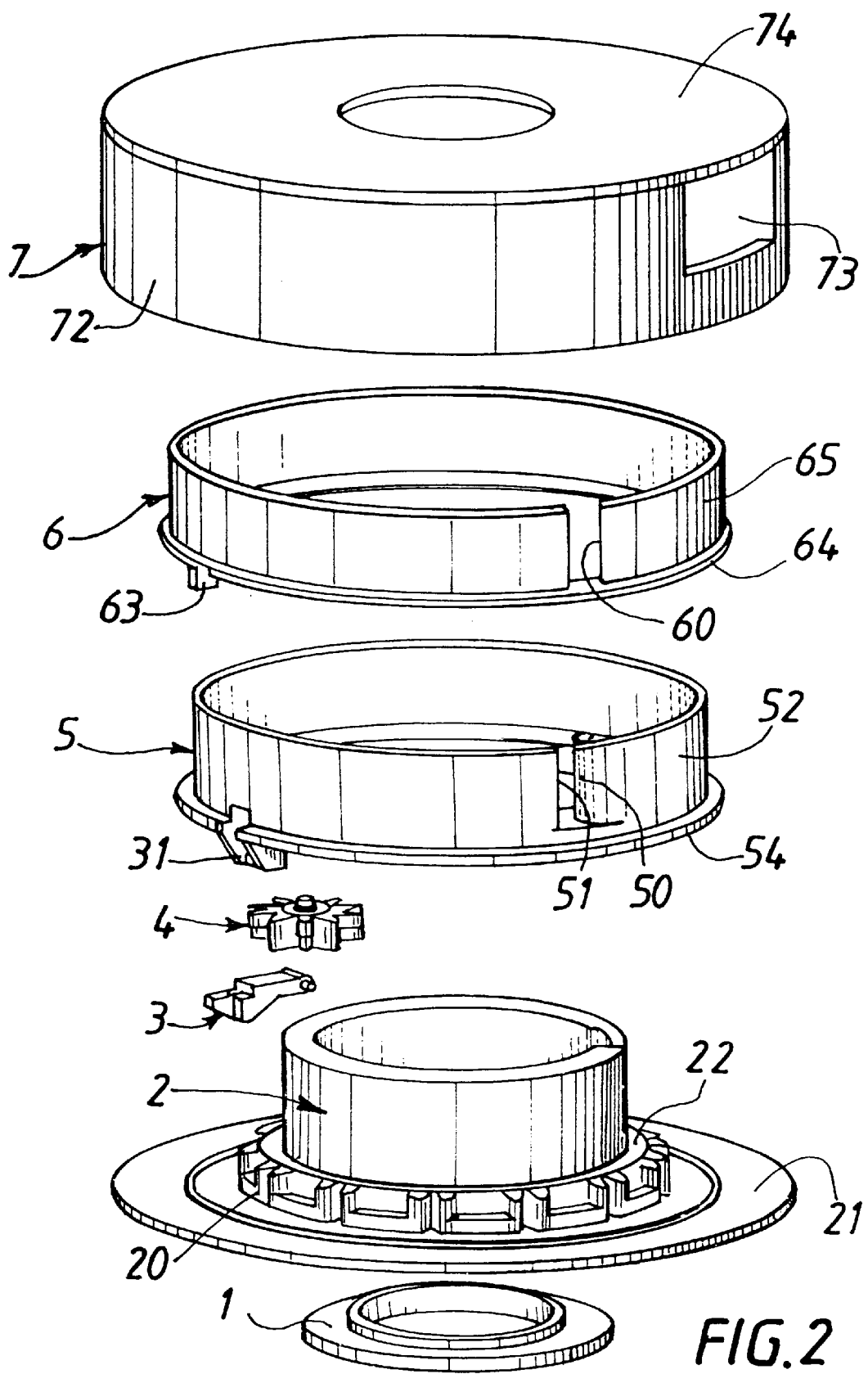
FIG. 2 is a view similar to FIG. 1 but viewed in the other axial direction.

FIGS. 1 to 9 show a rotary contactor for a motor vehicle, of the kind comprising two coaxial parts 2, 7 which are mounted for rotary movement of one with respect to the other against the action of a flexible, electrically connecting, tape 8, which is wound in a spiral between the said parts, being attached to one of the ends of one of the parts and to the other end of the other one of the parts.

In this example, one of these parts comprises a rotatable hub 2 which is adapted to be coupled in rotation to the steering wheel of the vehicle, together with a fixed housing 7, which is fixed to the fixed steering column of the vehicle via the switch support which is located below the steering wheel and which is not shown. The housing 2 is mounted within the hollow housing 7.

With a view to reducing the length of the flexible tape 8, and reducing the overall external size of the housing 7, in accordance with one feature of the invention the rotary contactor includes an inner rotor 5, of hollow annular form, which is mounted in rotation on the hub 2 and accommodated in the housing 7, together with a train of epicyclic gears 40, 20, 4 carried by the fixed housing 7, the movable hub 2 and the inner rotor 5, so as to drive the inner rotor 5 in rotation through the hub 2, and so as to reduce the number of turns between the movable hub 2 and the fixed housing 7.

The inner rotor has passage means 51 for the flexible tape 8. These means 51 consist in this example of a slot to be described later herein. In another version, they may consist of a window.

More precisely, in the drawings the rotary contactor comprises an assembly of components of plastics material, namely a ring 1, the movable hub 2, a finger 3, a pinion 4, the inner rotor 5, an external rotor 6, and the housing 7. The rotors 5, 6 are of hollow annular form, as is the housing 7, the form of which is simple.

Figure 11:
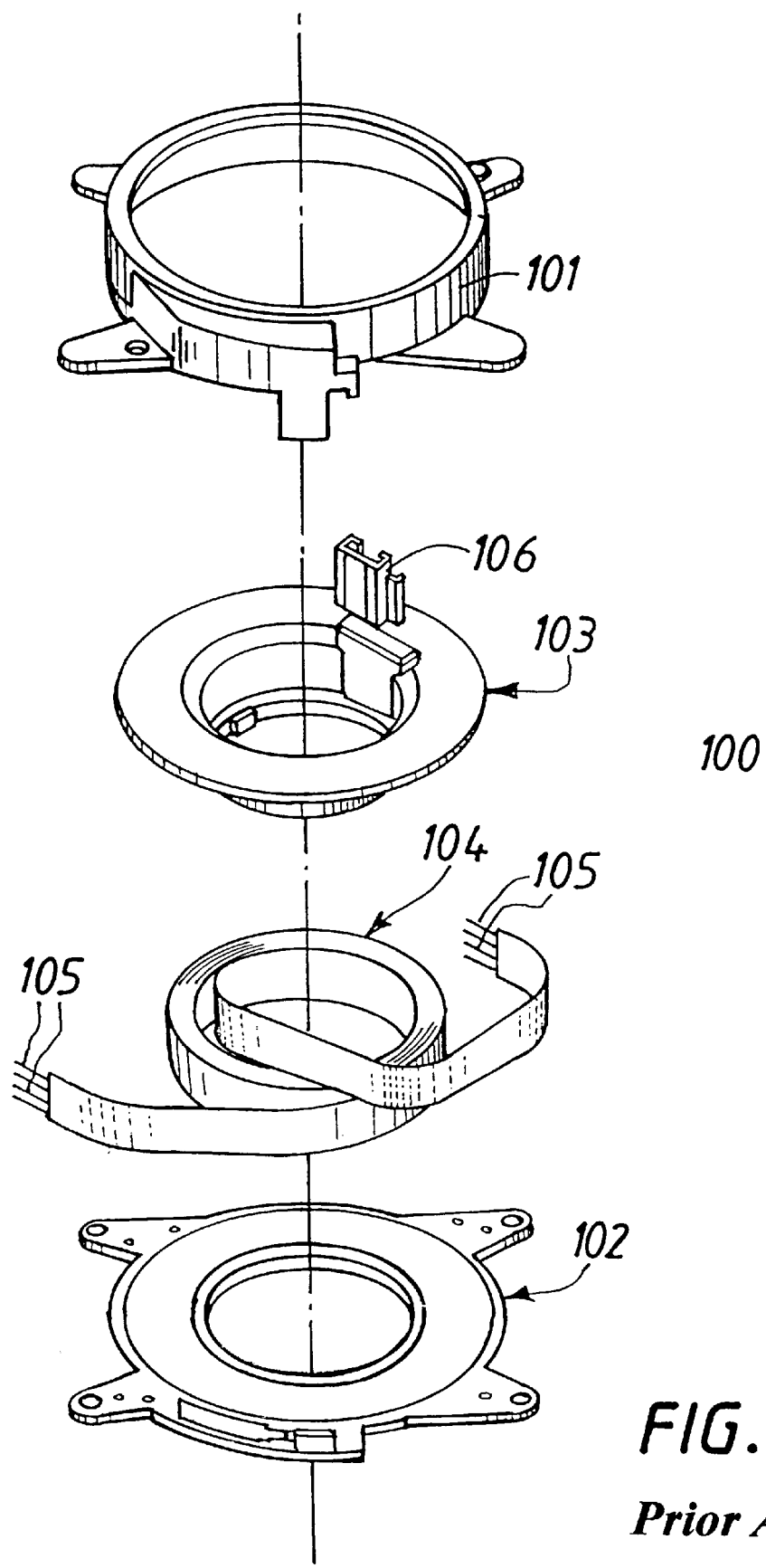
FIG. 11 is an exploded diagrammatic view of a contactor in accordance with the prior art.

These components are preferably made by molding. The housing 7 is a one-piece component in this example, by contrast with that in FIG. 11, and it includes a base 74, oriented transversely and joined at its outer periphery to an axially oriented annular skirt 72. The base 74 has a central hole at its inner periphery, and is formed with an axially projecting central portion 70 in the form of a tubular sleeve.

The skirt 72 includes within it an internal set of teeth 40 formed in its internal bore, with a smooth, transversely oriented, wall 71 projecting radially towards the axis of the assembly from the set of teeth 40 and carrying an axially projecting ramp 30. The internal bore of the skirt 72 is thus stepped, with a cylindrical portion which is joined through the wall 71 to the set of teeth 40 which are shallow but of greater internal diameter. The set of teeth 40, the teeth of which are arranged on a pitch circle, together with the ramp 30, which is of triangular (pointed) form with a rounded summit, are formed at the free end of the housing 7, that is to say in the upper part of the latter.

This housing, being of simple molded form, also has a side aperture 73 of substantially rectangular form, to enable the flexible electrically connecting tope to pass outside the housing and to provide connection to the associated integrated circuitry. In this example, a chimney (which is not shown, in the interests of simplicity) extends radially outwardly from the aperture 73.

The fixed housing 7 is thus of annular hollow form, and in this example, in the interests of simplicity, the ears whereby the housing 7 is fastened to the switch support, located under the steering wheel of the vehicle and connected to the end of the steering column, are not shown. In another version, the housing 7 may be formed directly in the central part of the said switch support, which reduces the number of components required.

The annular hollow rotors 5, 6 are mounted within the housing 7, and the electrically conductive flexible tape 8 is wound on and off these rotors, the tape including, encapsulated within an electrical insulator, a number of electrical paths or conductors, such as flattened conductive wires, the number of which is predetermined as a function of the application and the number of items of information to be transmitted between the fixed steering column and the rotatable steering wheel. The tape partly determines the thickness of the rotary contactor.

The ends of the conductive tape 8 are fixed, respectively, to a portion 80 of the housing 7 and a portion 81 of the movable hub 2, which is rotated by the steering wheel of the vehicle. The hub 2 is mounted for rotation on the housing 7 by means of the central chimney 70 of the latter. More precisely, the hub 2 is engaged through its inner periphery on the outer periphery of the chimney 70. The hub 2 has at one of its ends, namely its upper end, a transversely oriented flange 21 which is arranged to close off the housing 7.

It will be noted that the driving chimney (projecting radially) of the hub 2, for coupling the hub 2 in rotation with the steering wheel of the vehicle, has not been shown here. For more detail, reference should be made to FIG. 11. In this example the chimneys of the housing 7 and hub 2 are adjacent to the portions 80. 81.

The inner rotor 5 is centered by, and pivots around, the hub 2. The rotor 5 is generally in the form of a ring and includes an axially oriented annular peripheral skirt 52, which is joined at one of its ends (namely its upper end—

FIG. 1) to a transverse flange 54. This flange 54 carries an integral pivot 53 which projects axially in its upper part on the side opposed to its skirt 52, the pivot 53 being in this example in the form of a spigot arranged to receive the pinion 4, together with a bridge element 31 whereby a finger 3, which is acted on by a return spring 36 (FIG. 8), is retained and articulated.

For this purpose, the bridge element 31 includes (see FIGS. 6 to 8) cradle portions for receiving trunnions 32 formed on the finger 3 at that one of its axial ends that is the closer to the hub 2. The other end of the finger 3 is wedge-shaped. The finger has a spigot which is in facing relationship with another spigot carried by the bridge element 31 for mounting and centering, between the two heads, the return spring 36, which in this example is in the form of a coil spring. Thus the coil spring bears on the bridge portion of the bridge element 31 at one of its ends, and on the finger 3 at its other end, so as to maintain the said finger 3 constantly in a lower position, that is to say in contact with the base of a slot which is formed in the skirt 52 and which interrupts the flange 54 in the region of the bridge element 31.

In practice, the flange 54 constitutes a thickened portion which defines an annular rib at the outer periphery of a transversely oriented base portion 55 (FIG. 1) which is part of the rotor 5 in its upper region and which has a central hole. At its inner periphery, this base portion 55 has an integral portion constituting an axially thickened portion in the form of a centering sleeve 56. The bridge element 31 includes two knee portions which join the flange 54 to the sleeve 56, the internal diameter of which is smaller than that of the skirt 52. It is in these knee portions that the cradle elements for receiving the trunnions 32 are defined.

In the region of the flange 54, the bridge element 31 projects in axial superelevation, and has a generally U-shaped cross section, with two axially oriented branches anchored in the flange, together with a base portion which joins the two branches together and constitutes the above mentioned bridge portion on which the spring 36 bears. The branches of the U provide good retention for the finger 3.

It will be noted that it is the sleeve 56 that enables the inner rotor 5 to be mounted rotatably on the hub 2, so that, in accordance with one feature of the invention, there is a space between the hub and the internal bore of the skirt 52, to accommodate the tape and to enable the latter to be wound around the hub 2. The tape is thus protected by the rotor 5.

It will be noted that the wedge-shaped end of the finger 3 is joined through two lateral wing portions to the main portion of the finger 3, which carries the laterally projecting articulating trunnions 32. These wing portions enable the spring 36 to be guided. The wedge-shaped end of the finger 3 has a rounded internal face (FIG. 9) for cooperation with the ramp 30, and is offset axially with respect to the main portion of the finger 3.

The skirt 52 is slotted at 51 to provide a passage for the tape 8, the depth of the slot 51, which in this example is a blind slot, being a function of the height of the tape 8. This slot enables the tape 8 to pass easily through.

One of the edges of the slot 51 is rounded at 50 so as to enable the tape 8 to be deflected thereon without damaging the tape, in a manner to be described later herein. The rounded portion extends between the skirt 52 and the hub 2

The outer rotor 6 is again of annular form, and accordingly it has an annular skirt 65 which is joined in its upper portion (FIG. 1) to a transverse flange 64 which carries two external, axially projecting prongs 61, 62 of unequal length, which together constitute a fork 63. In this example, the prong 62 has a lesser height than the prong 61, the said prongs 61, 62 being offset circumferentially with respect to each other.

It will be noted that the hub 2 also has on its outer periphery a projecting set of teeth 20, referred to as an outer set of teeth, in the region of its flange 21., these teeth being a discontinuous set in this example. The set of teeth 20 is formed in a thickened portion 22 of the hub 2, at the outer periphery of the latter in the region of its flange 21. The thickened portion 22 defines a transverse abutment shoulder for the sleeve 56 of the inner rotor 5. The set of teeth 20 is not continuous over a circle, by contrast with the set of teeth 40, which is itself continuous, that is to say it is a complete set. The set of teeth 20 can of course be continuous on a circle, depending on the application.

The skirt 65 is of course also provided with a passage means 60, which in this example is a slot, for the flexible tape 8, with the outer rotor 6 surrounding the inner rotor 5.

Thus, the epicyclic gear train consists in this example of the sets of teeth 40, 20 and the pinion 4, which is mounted for rotation on the spigot 53, which is cylindrical and which thus constitutes a fixed trunnion of the inner rotor 5.

If necessary, further pinions can of course be provided, these being for example spaced apart at 120 degrees with respect to each other.

The pinion 4 is thus mounted for rotation on the trunnion 53, and drives the inner rotor 5 in stepping rotation in cooperation with the partial set of driving teeth 20 of the hub 2 and the fixed full set of teeth 40 of the housing 7.

The conjugation of the three elements 40, 20, 4 constitutes an epicyclic gear train having a step-up gear ratio in the proportion of the sum of the diameters of the hub and the inner rotor mounted on the hub.

If d1 is the outer diameter of the hub and d2 the outer diameter of the inner rotor, then the reduction ratio is equal to (d1+d2)/d1.

As will have been understood, the number of teeth in the set of teeth 20 on the hub (formed in the upper portion of the hub 2) is defined so as to obtain the step-up gear ratio which is matched to the dimensions of the rotary contactor, so that the set of teeth 20 may or may not be continuous.

The projecting driving finger 3 of the inner rotor 5 is adapted so as to cooperate with the ramp 30 having the double slope mentioned above, or cam, which is situated within the housing 7 in the upper portion of the latter, as is the set of teeth 40 which meshes with the complementary set of teeth of the pinion 4.

The outer diameter of the flange 54 is of course such that it does not interfere with the prongs 61, 62 of the fork 63, which is accordingly located radially between the flange 54 and the ramp 30. Also as a result, the outer rotor 6 includes, as an axial extension of its thickness with respect to its flange 64, an integral, internal centering sleeve 66 at the inner periphery of the flange 64.

The sleeve 66 has an internal bore the diameter of which is smaller than that of the skirt 65. The sleeve 66 thus enables the outer rotor 6 to be mounted for rotation on the inner rotor 5 (i.e. on the skirt 52 of the latter), while defining a space between the rotors 5, 6 for accommodating the flexible tape 8. There is of course also a space between the internal bore of the housing 7 and the outer rotor 6 to enable the tape 8 to be wound on to the rotor 6, which thus provides good support for the tape 8.

In this example, the tape 8 is an extruded multiconductor cable, the flexibility of which provides the return function necessary for the principle of operation of the rotary contactor. Its two ends are bent back at 90 degrees in order to enable it to pass directly out to the circuitry connections (the connectors), thus avoiding the need for any intermediate connection (FIG. 10).

The zones bent back at 90 degrees are molded on to the above mentioned portions 80 and 81 of the housing 7 and hub 2, so as to guarantee the required geometry and also to provide positioning and retention of the hub 2 in the chimney 70 and in the housing 7.

The electrical insulation of the tape 8 is preferably of a generally silent material having a low coefficient of friction. It is based for example on polyamide 11 or on a copolymer of ethylene and tetrafluorethylene which is stable at temperatures in the range between —55° and 150°. The electrical conductors of the tope are preferably flat wires.

The ring 1 mentioned above enables final assembly of the rotary contactor to be obtained by clipping it on to the chimney 70 of the housing 7. The ring 1 thus ensures retention and enables the components of the contactor to rotate.

Thus, in this example, the flexible tape 8 is applied by molding to the hub 2 and the housing 7 respectively, and a disconnectable rotary coupling is obtained between the rotors 5, 6 by virtue of the finger 3 and the prongs 61, 62, in a manner to be described below.

Figure 3:
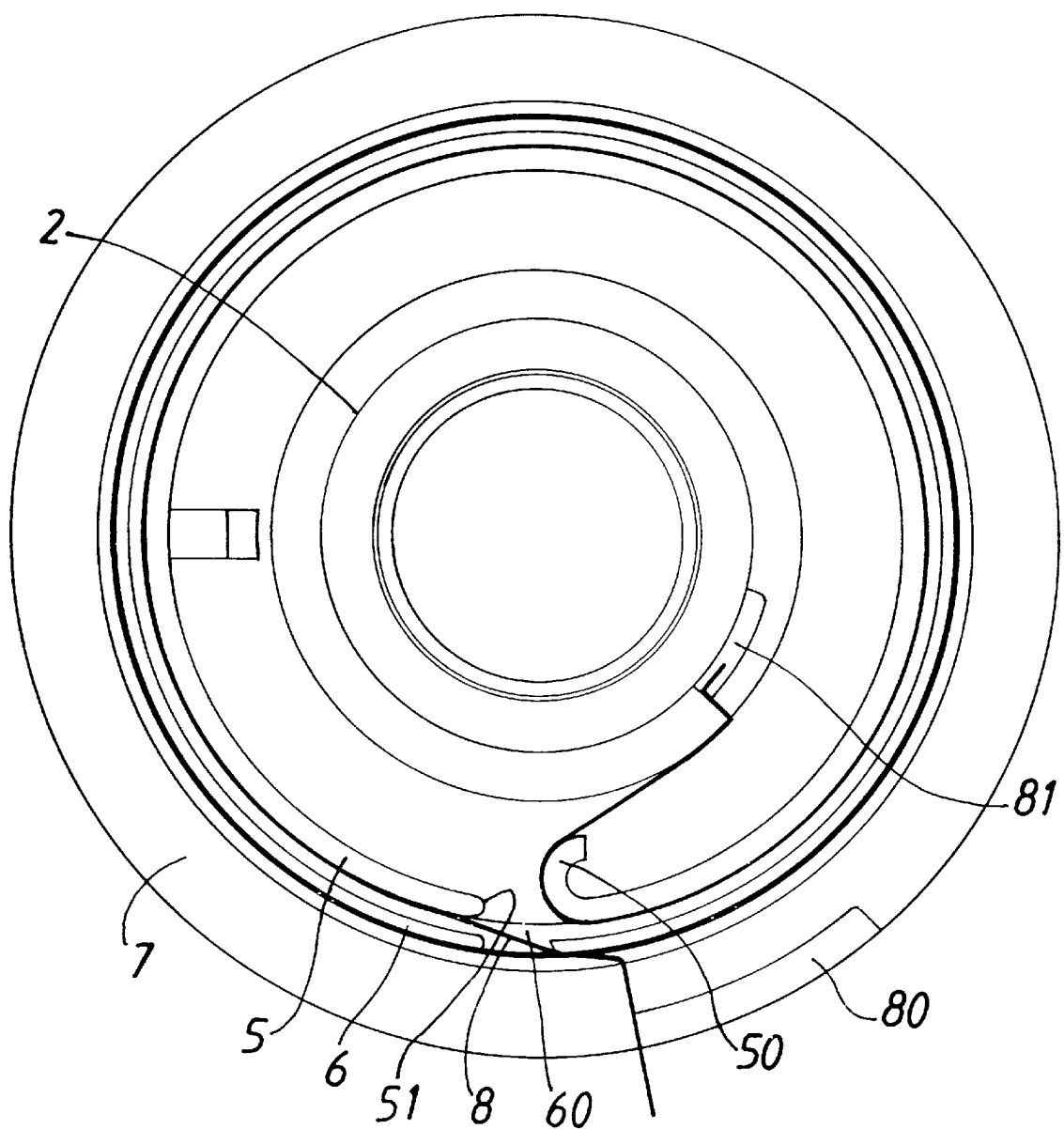
FIG. 3 is a diagrammatic view of the rotary contactor, showing the latter in one of its extreme positions of engagement, with the tape unwound.
Figure 6:
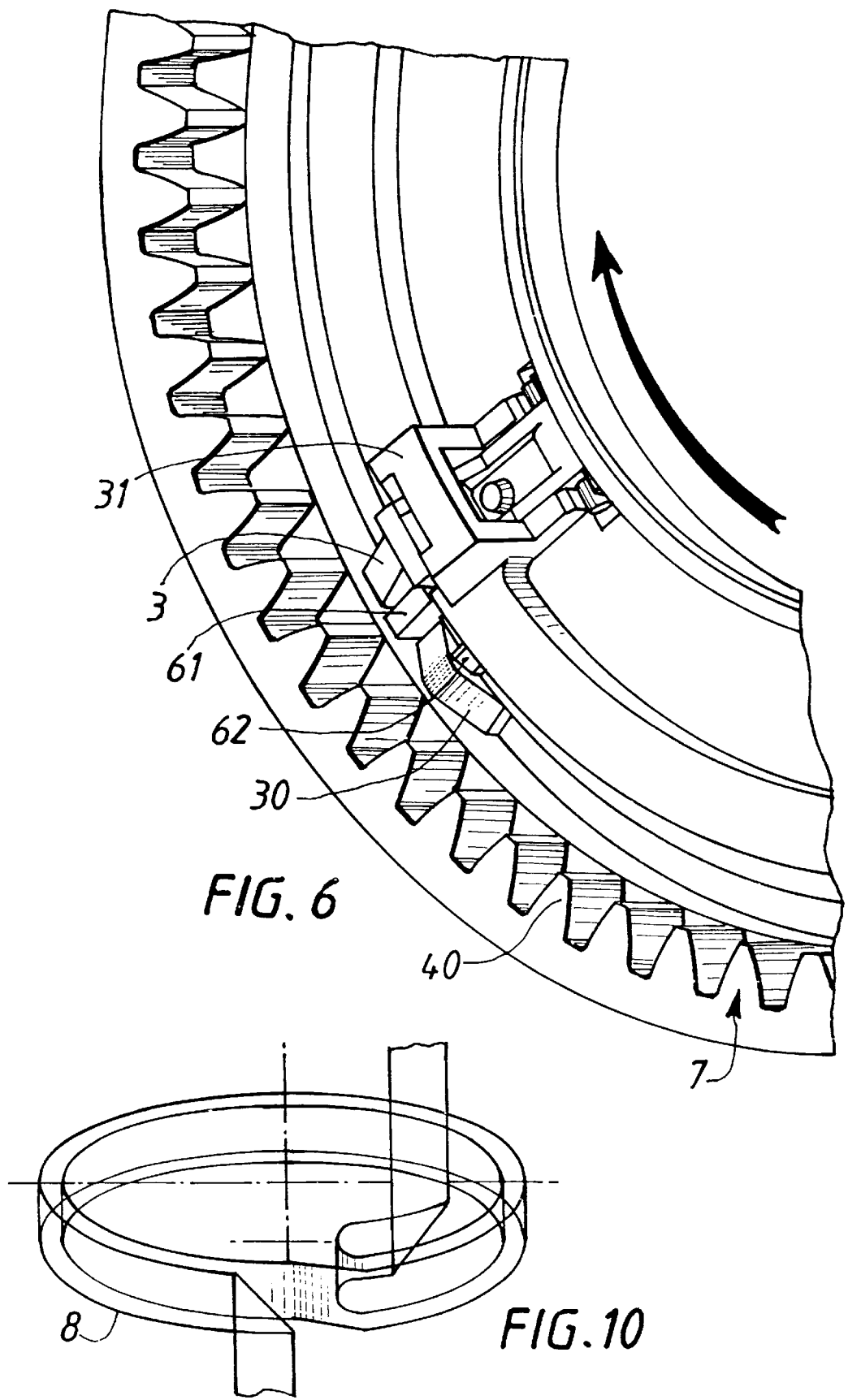
FIG. 6 is a partial view of the contactor without the hub, shown in its position corresponding to that of FIG. 5.
Figure 7:
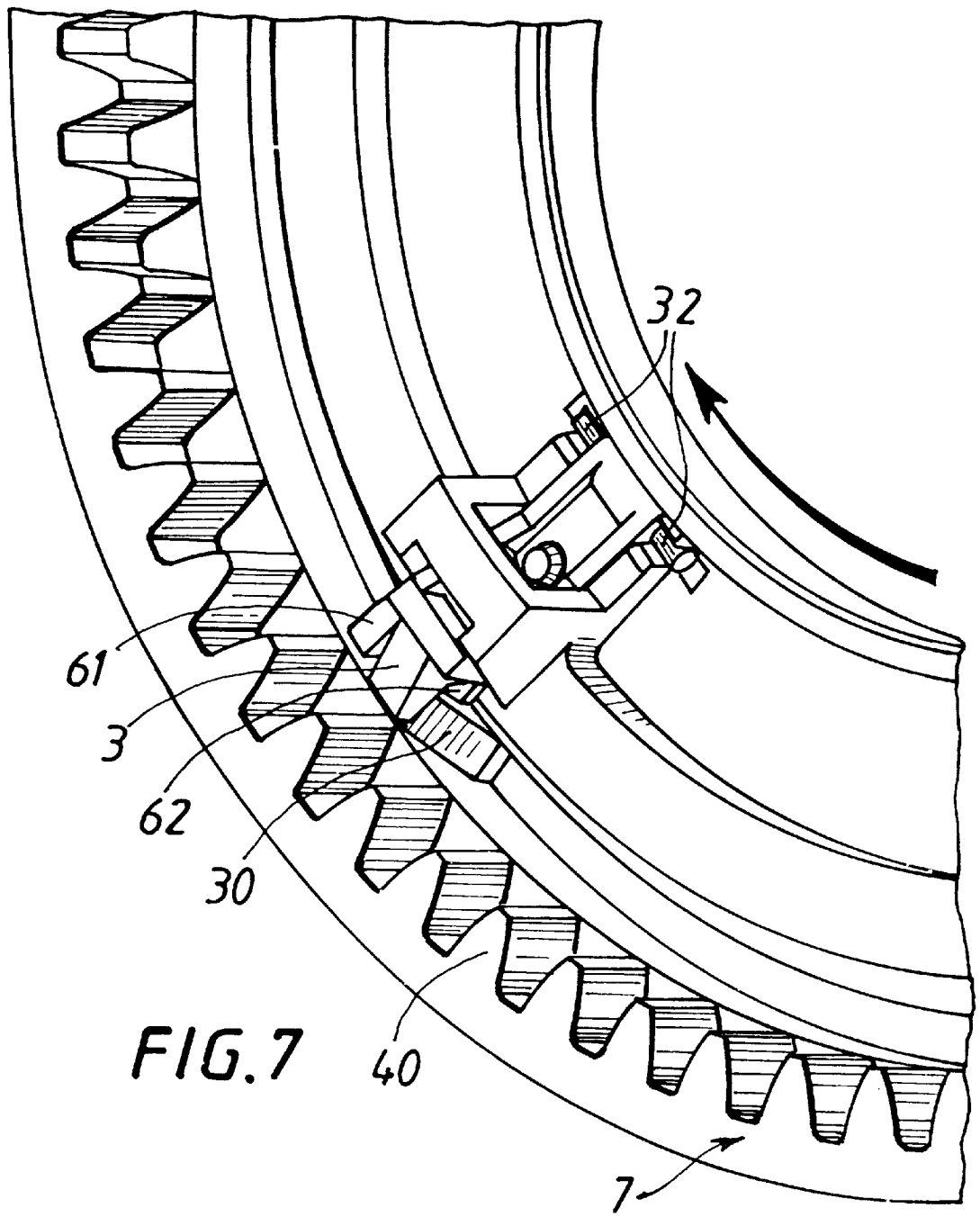
FIG. 7 is a partial view similar to FIG. 6, for the position of the contactor which corresponds to that in FIG. 3.
Figure 9:
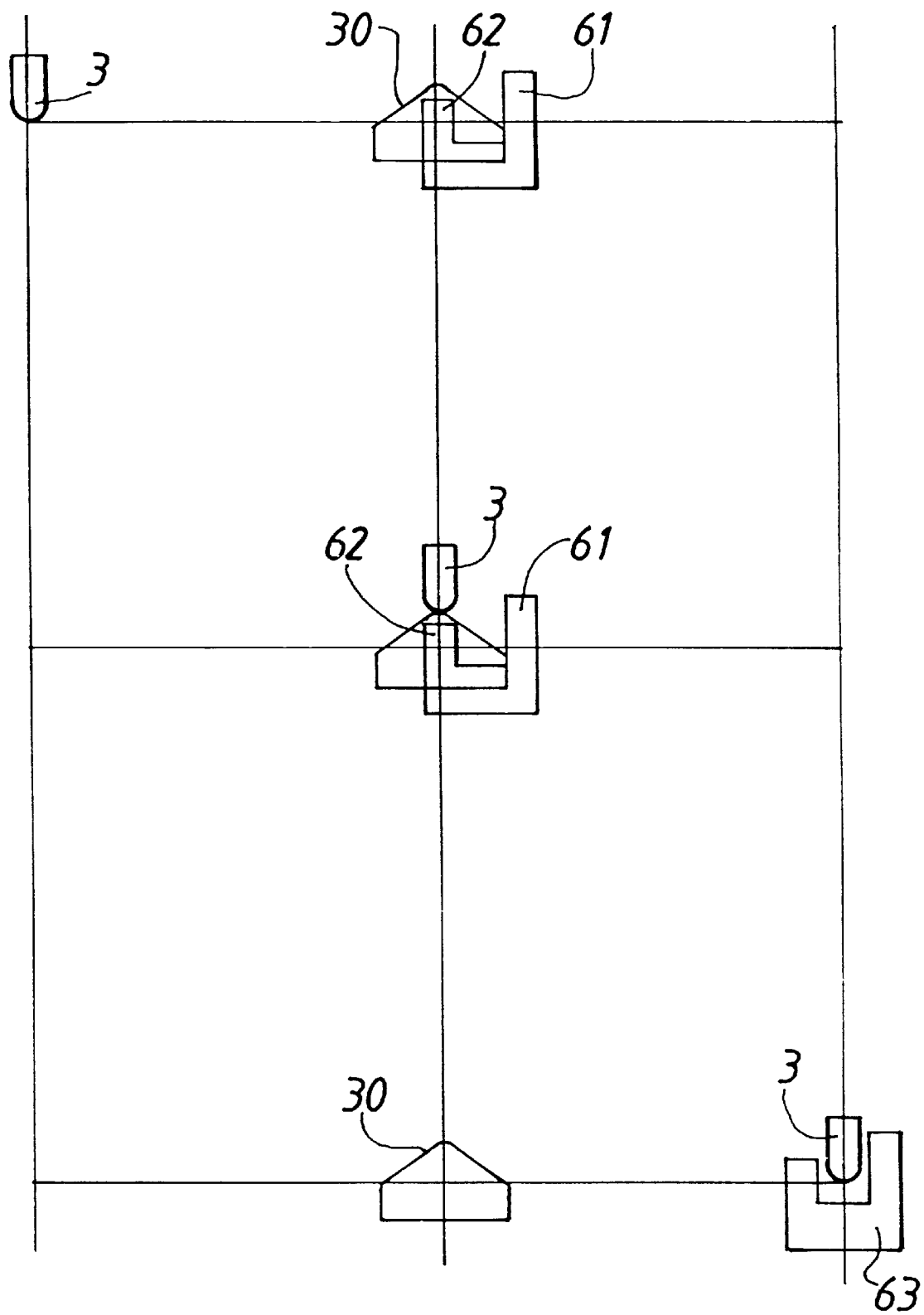
FIG. 9 is a diagrammatic view showing the various positions of the drive finger for, respectively, the extreme positions of engagement and the mean position.

Taking as the starting point for the rotational movement one of the extreme positions shown in FIGS. 3 and 6 and the left hand position in FIG. 9, the central hub 2 is driven in rotation by the steering wheel of the vehicle and pulls on the tape. The set of teeth 20 of the hub 2 drives the pinion 4, carried by the inner rotor 5, in rotation. This pinion engages on the similar, fixed set of teeth 40 located inside the housing 7 in the upper part of the latter, thus driving the inner rotor 5 in rotation. The outer rotor is stationary during this phase.

When the inner rotor has performed one revolution, the driving finger 3, fitted on the flange 54 of the said rotor 5 and driven by the latter, meets the fixed double-sloped ramp 30 (see FIG. 7 and the mean position in FIG. 9), located on the smooth portion 71 of the said housing 7, so that the finger can then, against the action of the spring 36, mount over the first prong 62 carried by the outer rotor 6, so that it then comes into abutment (see FIG. 8) on the second prong 61, shorter than the first prong 62, so as to drive the outer rotor 6 in rotation. The outer rotor, driven in this way, performs one revolution.

The distance between the prongs 61, 62 is of course a function of the thickness of the finger 3 (see the left hand part of FIG. 9), in order that the said finger 3 can be lodged between the two prongs 61, 62.

After the two revolutions of the inner rotor 5 and one revolution of the outer rotor 6 have been made, the hub 2 has rotated through a number of turns equal to or greater than five.

The number of revolutions of the hub 2 is thus determined by its outer diameter, and then by that of the two rotors 5, 6.

This dimensioning enables the step-up gear ratio of the epicyclic gear train 40, 20, 4 that is to be adopted in order to obtain correct dimensioning of the apparatus, to be determined.

As will have been understood, the epicyclic gear train 40, 20, 4 is of a double differential kind, due to the presence of the prongs 61, 62 and the finger 3 held by the bridge element 31.

For the other extreme position (FIG. 4), and the left hand position in FIG. 9, the direction of rotation of the hub 2 is reversed. The whole of the tape 8 is wound on to the hub 2.

Figure 8:
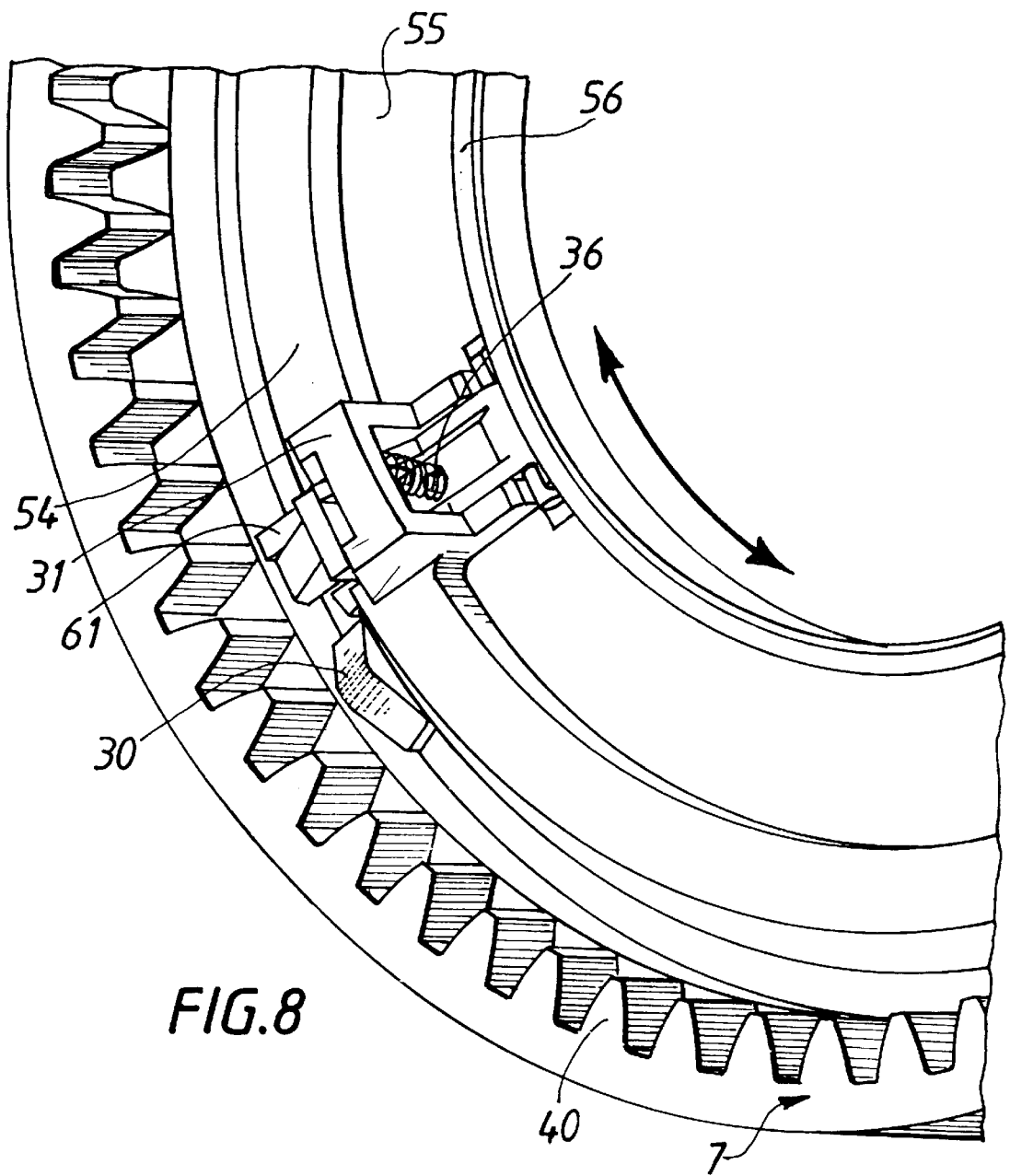
FIG. 8 is a view similar to FIG. 6, for the position of the contactor corresponding to that in FIG. 4.

The drive finger carried by the inner rotor 5 is positioned by the two prongs 61, 62 of the fork 63 of the outer rotor 6 (FIGS. 8 and 9). The two rotors 5, 6 are thus coupled together in rotation.

The rotation of the hub 2 drives the epicyclic gear train 40, 20, 4 in rotation, and this itself causes the inner rotor 5 to rotate so as to drive the outer rotor 6 in rotation.

At the end of a first revolution (FIG. 5), the driving finger 3 is raised by the pointed ramp 30 of the housing 7, thus disconnecting the rotational coupling between the rotors 5, 6.

After this, the inner rotor 5 is driven in rotation through one revolution by itself, so as to regain its original position (FIG. 3). Thus in the original position (FIGS. 3 and 10), the tape 8 is drawn as far as the slot 51 and is then turned, by virtue of the rounded portion 50, before being wound on to the skirt 52 in approximately one turn. A second turn is formed on the skirt 65 of the outer rotor 6, the tape having previously passed through the slot 60.

Figure 4:
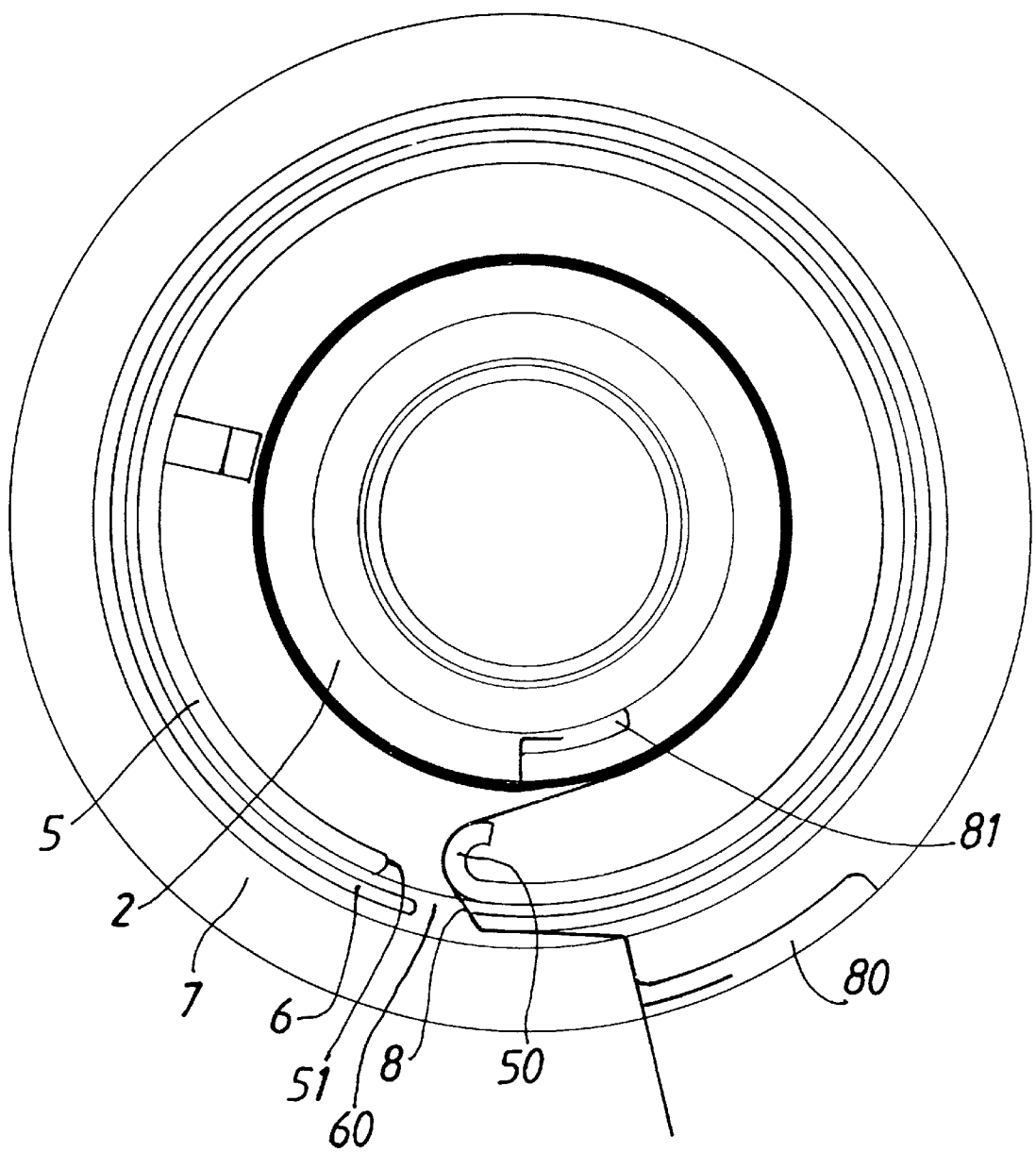
FIG. 4 is a view similar to FIG. 3, showing the rotary contactor in the fully unwound position in the other of its extreme positions.
Figure 5:
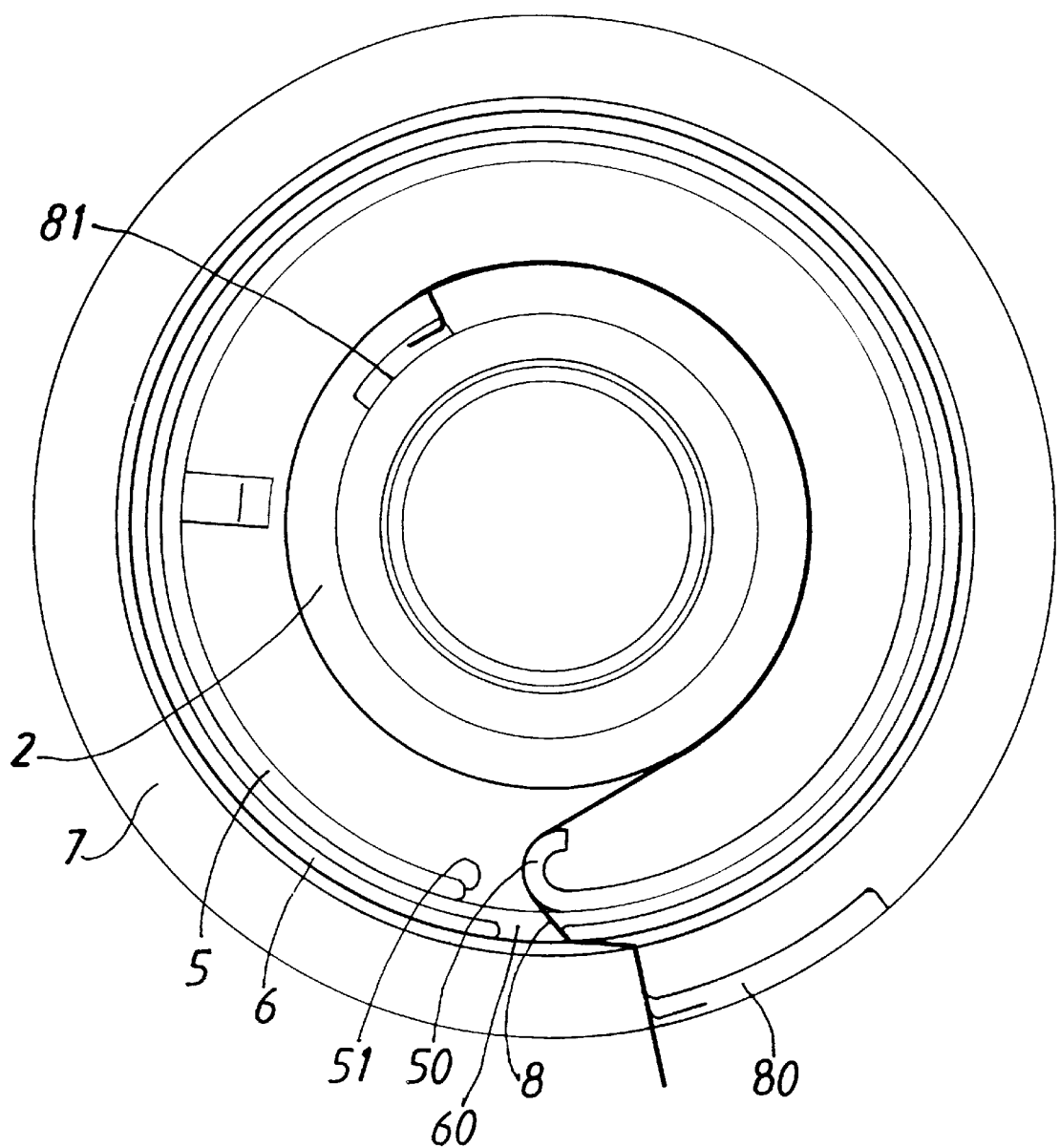
FIG. 5 is a view similar to FIG. 3 showing the rotary contactor in a middle position (with the steering wheel turned to the right)

In FIG. 4, the tape 8 is wound on to the hub 2 and passes over the rounded portion 50 so as to pass through the slots 51, 60 which are in corresponding relationship with each other. In FIG. 5, the tape is wound on to the hub 2 and on to the outer rotor, passing through the slots 51, 60.

Thus, thanks to the invention, the device for multiplying turns, based on the double differential principle, gives a gain in tape length in a ratio that lies in the range between 6 and 10, the ratio 10 corresponding to an arrangement in which the diameter of the hub 2 is large, and the ratio 6 to an arrangement in which the diameter of the hub 2 is small.

It will be appreciated that all this is obtained without any microfractures, due to the advantageously low coefficient of friction of the insulation of the tape 8.

It will be appreciated that the arrangement is less noisy than that in the prior art, because the tape is shorter and the hollow rotors are simple components with a skirt on which the tape is wound, together with an axially oriented centering sleeve inside the skirt, for the rotary mounting of the rotor on the hub and on the inner rotor respectively, defining a space for the tape. The length of the sleeves 56, 66 depends on the application. In this example, the sleeves 56, 66 are short, and consist of collar portions, while the end of the chimney 70, close to the base 74 of the housing 7, is preferably of stepped form and has cylindrical centering portions on which the free ends of the skirt 52 and the skirt 65 are respectively fitted.

Thus, the rotors 5 and 6 are mounted for rotation at each of their free ends on the stepped chimney 70, and at their other end, by virtue of the collar portions 56, 66, on the hub 2 and on the inner rotor 5 respectively.

The presence of the outer rotor does of course depend on the application, and a single rotor may be provided.

It will be appreciated that, despite the thickness of the inner rotor 5, the external diameter of the contactor can be reduced due to the fact that the tape is shortened, given that the latter is mounted with clearances within the housing 7 in the same way as a watch spring.

An improved reduction in overall size is obtained with the two rotors because the presence of the second rotor, in spite of its thickness, enables the tape to be shortened and enables even more space to be A double differential motion transmitting device between the housing 7 and the hub 2 is obtained by virtue of the two rotors, the epicyclic gear train, and the disengageable rotational coupling between the said rotors, so that the epicyclic gear train is of a double differential type.

It will be appreciated that the tape 8 is conserved., because it winds on to the hub 2 and the skirts of the rotors 5, 6. It is thus well supported, with its winding action taking place in a circular mode. The depth of the housing 7 is small.

I claim:

1. A rotary contactor, especially for motor vehicles, comprising:

two coaxial parts which are mounted for rotation of one with respect to the other against the action of an electrically connecting flexible tape which is wound in a spiral between the coaxial parts, being attached at one of its ends to one of the coaxial parts and at its other end to the other one of the coaxial parts, wherein one of the coaxial parts comprises a rotatable hub, and the other coaxial part comprises a hollow fixed housing containing the hub within it, and wherein the fixed housing includes an axially oriented annular skirt, within which there is formed a set of internal teeth constituting part of an epicyclic gear train, which also comprises a set of teeth projecting from the outer periphery of the hub together with at least one pinion for meshing with the set of internal teeth of the fixed housing and with the set of teeth of the hub, the train enabling the number of revolutions between the movable hub and the fixed housing to be demultipled, wherein the pinion is carried in rotation by an inner rotor of hollow annular form having an axially oriented annular skirt, the inner rotor being mounted in rotation on the movable hub within the fixed housing, wherein there is a space between the movable hub and the internal bore of the skirt of the inner rotor for accommodating the tape and for winding of the tape around the movable hub, and wherein the skirt of the inner rotor has a passage for the flexible tape, the tape being adapted to wind on to the skirt of the inner rotor;

an outer rotor of hollow annular form disposed inside the fixed housing and surrounding the inner rotor; and a rotary coupling acting disconnectably between the inner rotor and the outer rotor so that the epicyclic gear train is of a double differential type.

2. A rotary contactor according to claim 1, wherein the inner rotor carries a spigot for rotary mounting of the pinion thereon, the set of teeth of the housing is continuous, while the set of teeth of the hub is discontinuous.

3. A rotary contactor according to claim 1, wherein the passage means comprises a slot formed in the skirt of the inner rotor, and one of the edges of the slot has a rounded portion for redirecting the tape.

4. A rotary contactor according to claim 1, wherein the inner rotor has at one of its ends a transverse base and a sleeve for the centering and rotary mounting of the inner rotor on the hub.

5. A rotary contactor according to claim 1, wherein the outer rotor has an annular skirt which is slotted to allow the flexible tape to pass through, the slot begin formed in an annular skirt of the outer rotor, for winding of the flexible tape thereon.

6. A rotary contactor according to claim 1, wherein the inner rotor carries a driving finger which is adapted to cooperate with prongs carried by the outer rotor.

7. A rotary contactor according to claim 6, wherein the prongs of the outer rotor are of different heights.

8. A rotary contactor according to claim 6, wherein the driving finger is adapted to cooperate with a ramp carried internally by the housing.

9. A rotary contactor according to claim 6 wherein the outer rotor is mounted for rotation on the inner rotor by a centering sleeve mounted on an annular skirt of the inner rotor, for winding of the flexible tape thereon.

10. A rotary contactor according to claim 6, wherein the driving finger is mounted for tilting movement on the inner rotor by a bridge element of the inner rotor.

11. A rotary contactor according to claim 10, wherein the driving finger has at one of its ends two lateral trunnions for mounting in cradle elements fixed to the bridge element.

12. A rotary contactor according to claim 10, wherein the driving finger is acted on by a return spring, which bears on a bridge portion of the bridge element and on the upper portion of the driving finger.

13. A rotary contactor according to claim 12, wherein the driving finger is wedge-shaped at its other end, for cooperation with a pointed ramp carried internally by the housing.

* * * * *

UNITED STATES PATENT AND TRADEMARK OFFICE
CERTIFICATE OF CORRECTION

PATENT NO. : 5,971,781
DATED      :   October 26, 1999
INVENTOR(S) :  Daniel Lagier It is certified that error appears in the above-identified patent and that said Letters Patent is hereby corrected as shown below:

In claim 5, col. 10, line 13, please delete "begin" and insert therefor -- being --.

Signed and Sealed this

Thirteenth Day of June, 2000

*Attest:*

Q. TODD DICKINSON

*Attesting Officer*            *Director of Patents and Trademarks*